US012663346B2

(12) United States Patent
Khonsari et al.

(10) Patent No.: US 12,663,346 B2
(45) Date of Patent: Jun. 23, 2026

(54) FATIGUE ASSESSMENT

(71) Applicants: Michael M. Khonsari, Baton Rouge, LA (US); Behnam Hajshirmohamadi, Detroit, MI (US); BOARD OF SUPERVISORS OF LOUISIANA STATE UNIVERSITY AND AGRICULTURAL AND MECHANICAL COLLEGE, Baton Rouge, LA (US)

(72) Inventors: Michael M. Khonsari, Baton Rouge, LA (US); Behnam Hajshirmohamadi, Detroit, MI (US)

(73) Assignee: Board of Supervisors of Louisana State University and Agricultural and Mechanical College, Baton Rouge, LA (US)

( * ) Notice: Subject to any disclaimer, the term of this patent is extended or adjusted under 35 U.S.C. 154(b) by 247 days.

(21) Appl. No.: 18/559,126

(22) PCT Filed: May 6, 2022

(86) PCT No.: PCT/US2022/072176
§ 371 (c)(1),
(2) Date: Nov. 6, 2023

(87) PCT Pub. No.: WO2022/236325
PCT Pub. Date: Nov. 10, 2022

(65) Prior Publication Data
US 2024/0241022 A1     Jul. 18, 2024

Related U.S. Application Data

(60) Provisional application No. 63/185,215, filed on May 6, 2021.

(51) Int. Cl.
*G01N 3/34*     (2006.01)
*G01N 25/72*     (2006.01)

(52) U.S. Cl.
CPC ............... *G01N 3/34* (2013.01); *G01N 25/72* (2013.01); *G01N 2203/0005* (2013.01);
(Continued)

(58) Field of Classification Search
CPC .. G01N 3/34; G01N 25/72; G01N 2203/0005; G01N 2203/0019;
(Continued)

(56) References Cited

U.S. PATENT DOCUMENTS

| 8,209,133 B2 | 6/2012 | Darehibidi et al. |
| 9,243,985 B2 | 1/2016 | Khonsari et al. |
| | (Continued) | |

FOREIGN PATENT DOCUMENTS

| WO | WO-2013105995 A2 * | 7/2013 | ............... G01N 3/32 |

OTHER PUBLICATIONS

International Searching Authority, WIPO, Search report and written opinion for priority application PCT/US2022/72176, mailed Jul. 26, 2022.

*Primary Examiner* — Brandi N Hopkins
(74) *Attorney, Agent, or Firm* — Edel Patents LLC; John B. Edel

(57) ABSTRACT

Methods of evaluating mechanical fatigue using nondestructive techniques are described herein. Such techniques involve mechanically testing a component to establish a relationship between some measure of actuation and a temperature profile produced during the testing. Measurements from a separate external heating test that generates a similar temperature profile on the component may then be used to generate an estimate of a fatigue lifespan of the component by utilizing data from those tests.

19 Claims, 10 Drawing Sheets

(52) U.S. Cl.
  CPC .............. *G01N 2203/0019* (2013.01); *G01N*
    *2203/0023* (2013.01); *G01N 2203/0025*
    (2013.01); *G01N 2203/0073* (2013.01); *G01N*
    *2203/0218* (2013.01); *G01N 2203/0226*
    (2013.01); *G01N 2203/0228* (2013.01)

(58) Field of Classification Search
  CPC ... G01N 2203/0023; G01N 2203/0025; G01N
    2203/0073; G01N 2203/0218; G01N
    2203/0226; G01N 2203/0228; G01N
    3/32; G01N 3/18; G01N 3/08; G06F
    19/00; C22C 21/00; A61L 27/047; G01R
    31/3679; G01M 99/002; G01B 21/32;
    F25B 21/00
  USPC ................................... 73/849, 818, 826, 841
  See application file for complete search history.

(56)                References Cited

U.S. PATENT DOCUMENTS 9,476,815 B2    10/2016   Khonsari et al.
2012/0084019 A1*   4/2012   Khonsari ............... C22C 38/00
                                                702/35

* cited by examiner

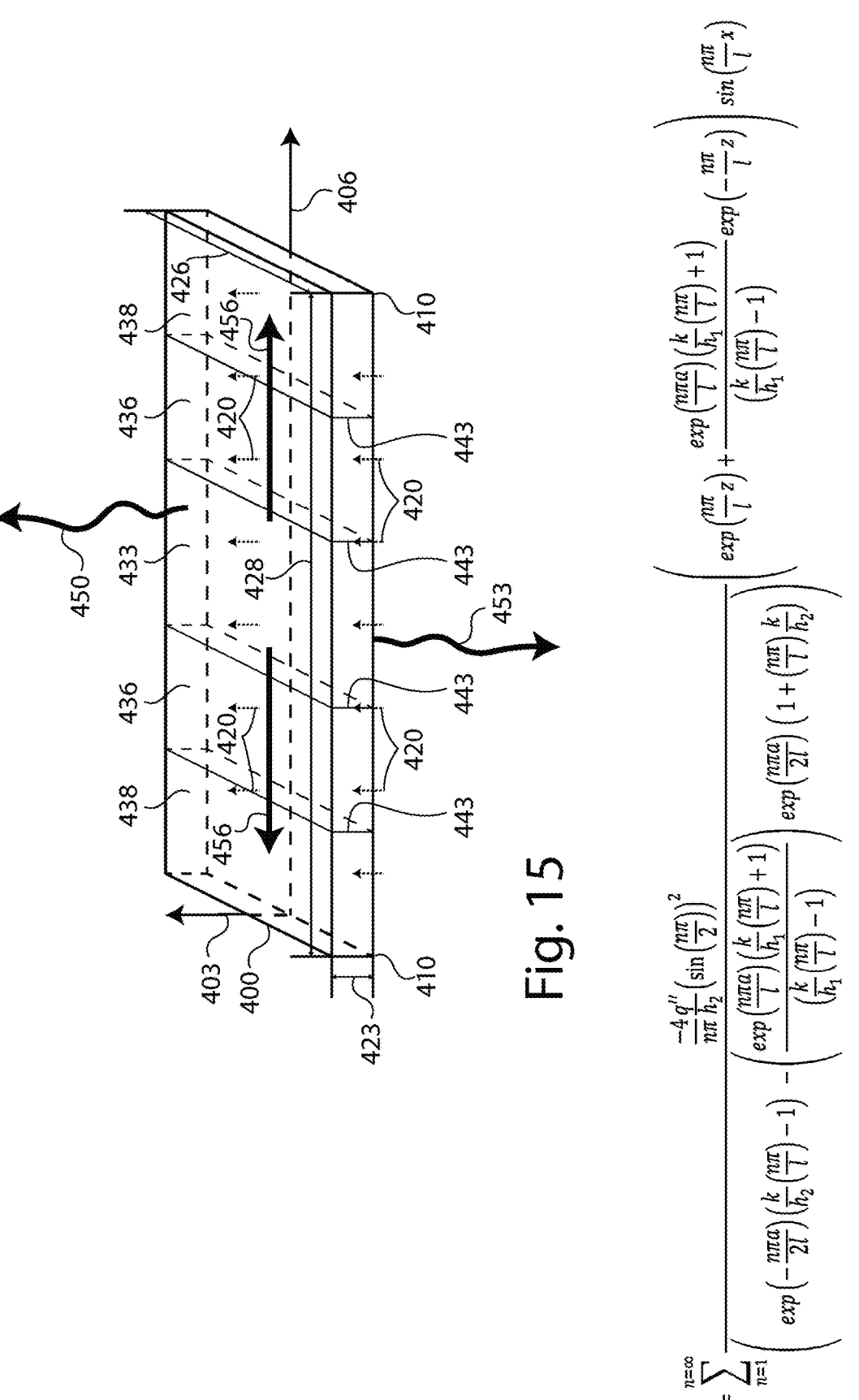

Fig. 15

$$\theta = \sum_{n=1}^{n=\infty} \frac{-4 \frac{q''}{n\pi} \frac{l}{h_2} \left(\sin\left(\frac{n\pi}{2}\right)\right)^2}{\exp\left(-\frac{n\pi a}{2l}\right)\left(\frac{k}{h_2}\left(\frac{n\pi}{l}\right)-1\right) - \left(\frac{\exp\left(\frac{n\pi a}{l}\right)\left(\frac{k}{h_1}\left(\frac{n\pi}{l}\right)+1\right)}{\left(\frac{k}{h_1}\left(\frac{n\pi}{l}\right)-1\right)}\right) \exp\left(\frac{n\pi a}{2l}\right)\left(1 + \left(\frac{n\pi}{l}\right)\frac{k}{h_2}\right)}$$
$$\left(\exp\left(\frac{n\pi}{l}z\right) + \frac{\exp\left(\frac{n\pi a}{l}\right)\left(\frac{k}{h_1}\left(\frac{n\pi}{l}\right)+1\right)}{\left(\frac{k}{h_1}\left(\frac{n\pi}{l}\right)-1\right)} \exp\left(-\frac{n\pi}{l}z\right)\right) \sin\left(\frac{n\pi}{l}x\right)$$

Fig. 16

FATIGUE ASSESSMENT

This application claims the benefit of U.S. provisional application No. 63/185,215 filed on May 6, 2021 and entitled FATIGUE ASSESSMENT.

Methods of evaluating mechanical fatigue described herein may be used in the maintenance and evaluation of a wide variety of mechanical components. Certain methods disclosed herein may be used to evaluate the useful life of components without destructive testing.

BRIEF DESCRIPTION OF DRAWINGS

FIG. 15 shows a bar undergoing two-dimensional heat transfer based on heat flux from the bottom.

FIG. 16 shows an equation for temperature rise.

DETAILED DESCRIPTION

Example Set A

As described herein, $A_k$ indicates thermodynamic forces associated with internal variables, $\dot{Q}_{gen}$ indicates a rate of heat generation (J/s), a indicates specimen thickness, $\dot{Q}_{in}$ indicates heat rate entering control volume (J/s), b indicates the width of specimen (m), $\dot{Q}_{out}$ indicates heat rate exiting control volume (J/s), $c_p$ indicates specific heat capacity (J/kgK), $\dot{S}_i$ indicates entropy production rate (J/m$^3$K), $d_eS$ indicates entropy flow (J/K), T indicates absolute temperature (K), $d_iS$ indicates internal entropy generation (J/K), $T_0$ indicates absolute ambient temperature (K), dS indicates entropy change (J/K), $T_s$ indicates absolute surface temperature (K), E indicates elastic modulus (GPa), $t_f$ indicates time to failure (s), $E_F$ indicates fermi energy level (J), t* indicates time at which cooling begins (s), f indicates frequency (Hz), U indicates electric potential difference (Volt), $F_{12}$ indicates radiation view factor, $\dot{U}$ indicates rate of internal energy change (J/s), FFE indicates fracture fatigue entropy (MJ/m$^3$K), V indicates control volume (m$^3$), h indicates convection coefficient (W/m$^2$K), $\dot{v}_k$ indicates internal variables, I indicates current (Amp), $\dot{w}_p$ indicates plastic work dissipation (J/sm$^3$), k indicates thermal conductivity (W/mk), W indicates specimen thickness (m), $N_f$ indicates number of cycles to failure, $\dot{W}$ indicates work done on the system per second (J/s), P indicates power consumed by coil (W), $\delta$ indicates displacement of bending test (m), $q_{cd}$ indicates conductive heat transfer (J), $\dot{\varepsilon}_p$ indicates plastic strain rate (1/s), $q_{cv}$ indicates convective heat transfer (J), $\theta$ indicates temperature rise $\theta=T-T_0$, q" indicates heat flux (W/m$^2$), $\rho$ indicates density (kg/m$^3$), Q indicates thermal current (J/s), $\sigma$ indicates stress (MPa), and $\dot{Q}$ indicates rate of heat transfer from system (J/s).

Fatigue may drastically limit the life of machinery and result in catastrophic failure without warning. Fatigue may be categorized by a stress-based approach, a strain-based approach, and energy-based methods.

Methods described herein include evaluating the energy dissipation of the fatigue process based on heating the specimen by means of an external heating coil. The methods include details relating to the generated steady-state surface temperature and its use to predict fatigue life. As described herein, steady-state temperature profiles generated by an external heating source can be used to mimic the response of the material to the cyclic loading of a fatigue test.

Figure 1:
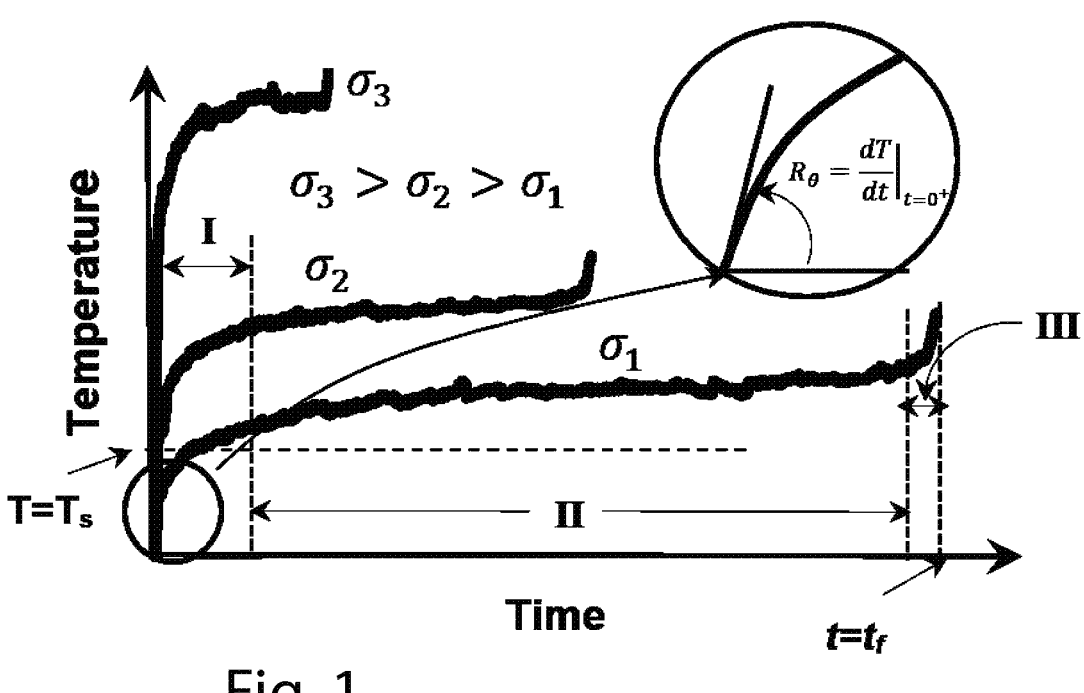
FIG. 1 is a plot of surface temperature against time for various stress levels.

A specimen's surface temperature was monitored via an infra-red camera and the results for three different stress levels $\sigma_1$, $\sigma_2$, and $\sigma_3$ are shown in FIG. 1. The temperature depends on the amplitude of the cyclic load, and the higher the loading amplitude, the higher is the resulting temperature rise. Fatigue evaluations described herein may be evaluated in cases of cyclic tension-compression, fully-reversed bending, and torsion among many other forms of fatigue. Temperature evolves in three distinct Phases I, II, and III as shown for stress level $\sigma_1$ in FIG. 1. In Phase I, the surface temperature increases from the ambient temperature at the beginning of the test until it reaches a steady state in Phase II, when the heat generated in the material strikes a balance with the heat loss to the surroundings. In this phase, the temperature is $T=T_s$ and remains fairly steady for most of the specimen's life until it reaches the third and the final phase where the temperature begins to increase first slowly followed by an abrupt temperature rise until fracture occurs at $t=t_f$. As depicted in FIG. 1 the initial slope of temperature rise at the onset of fatigue is $R_\theta$.

Figure 3:
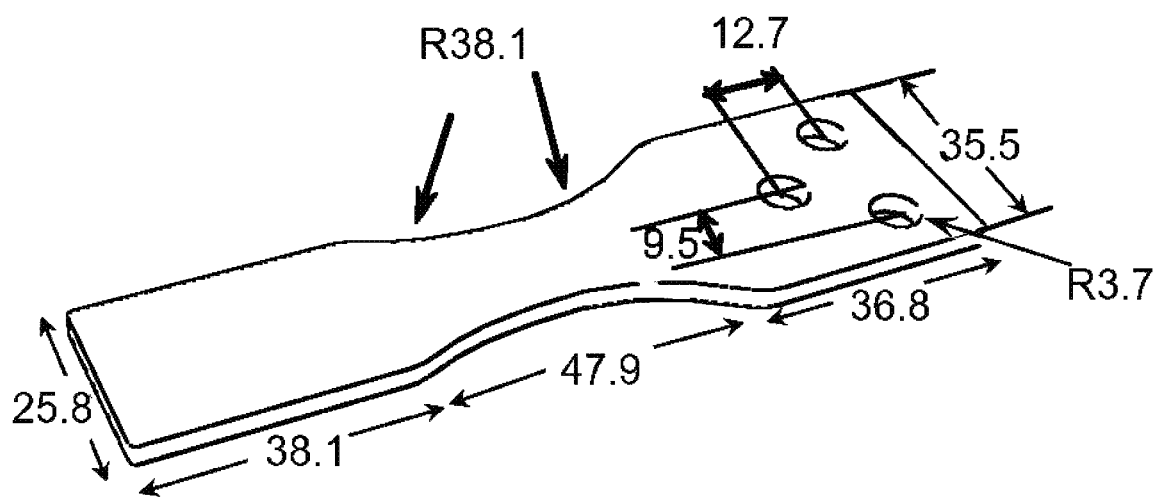
FIG. 3 depicts a bending test specimen as tested in described examples.
Figure 4:
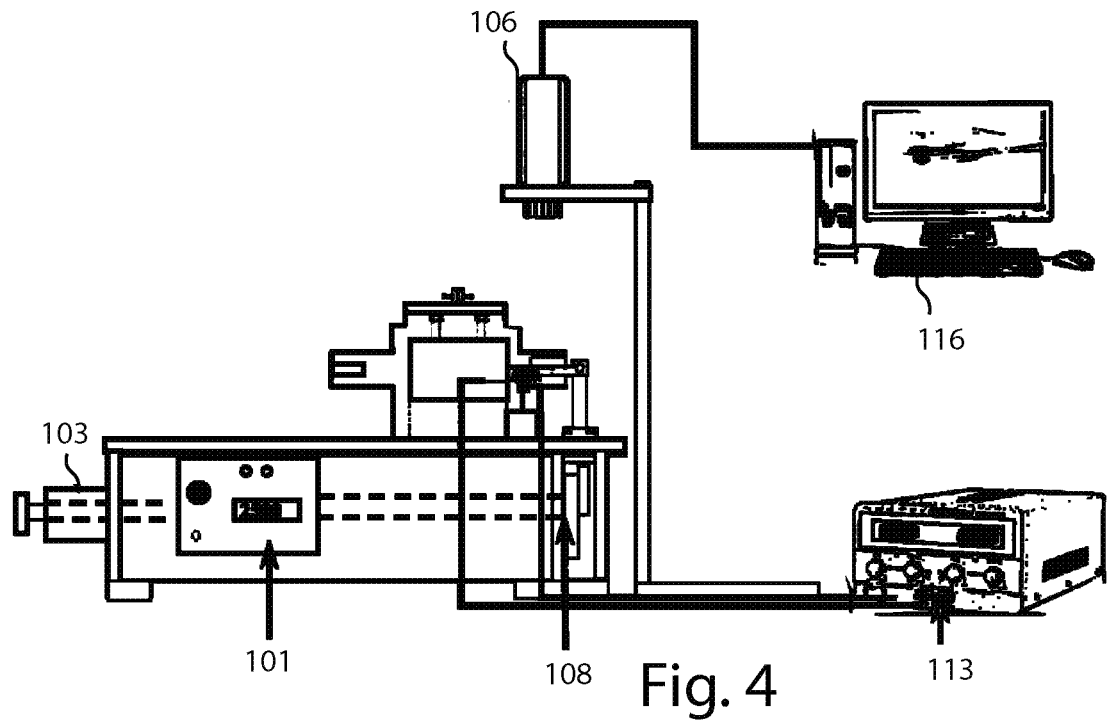
FIG. 4 depicts a bending fatigue machine.
Figure 5:
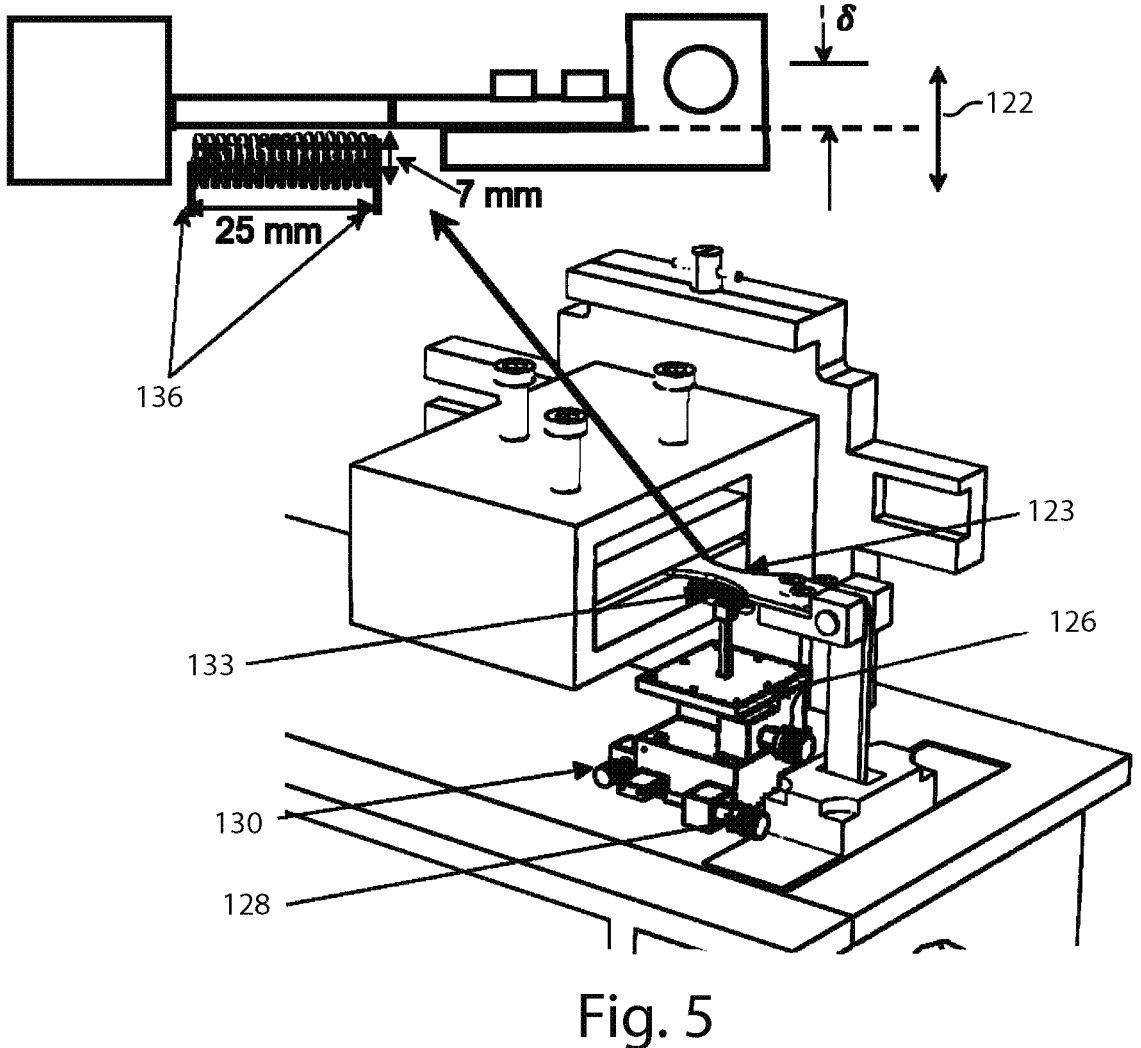
FIG. 5 depicts a bending fatigue machine with a heating coil.
Figures 6A, 6B, 7:
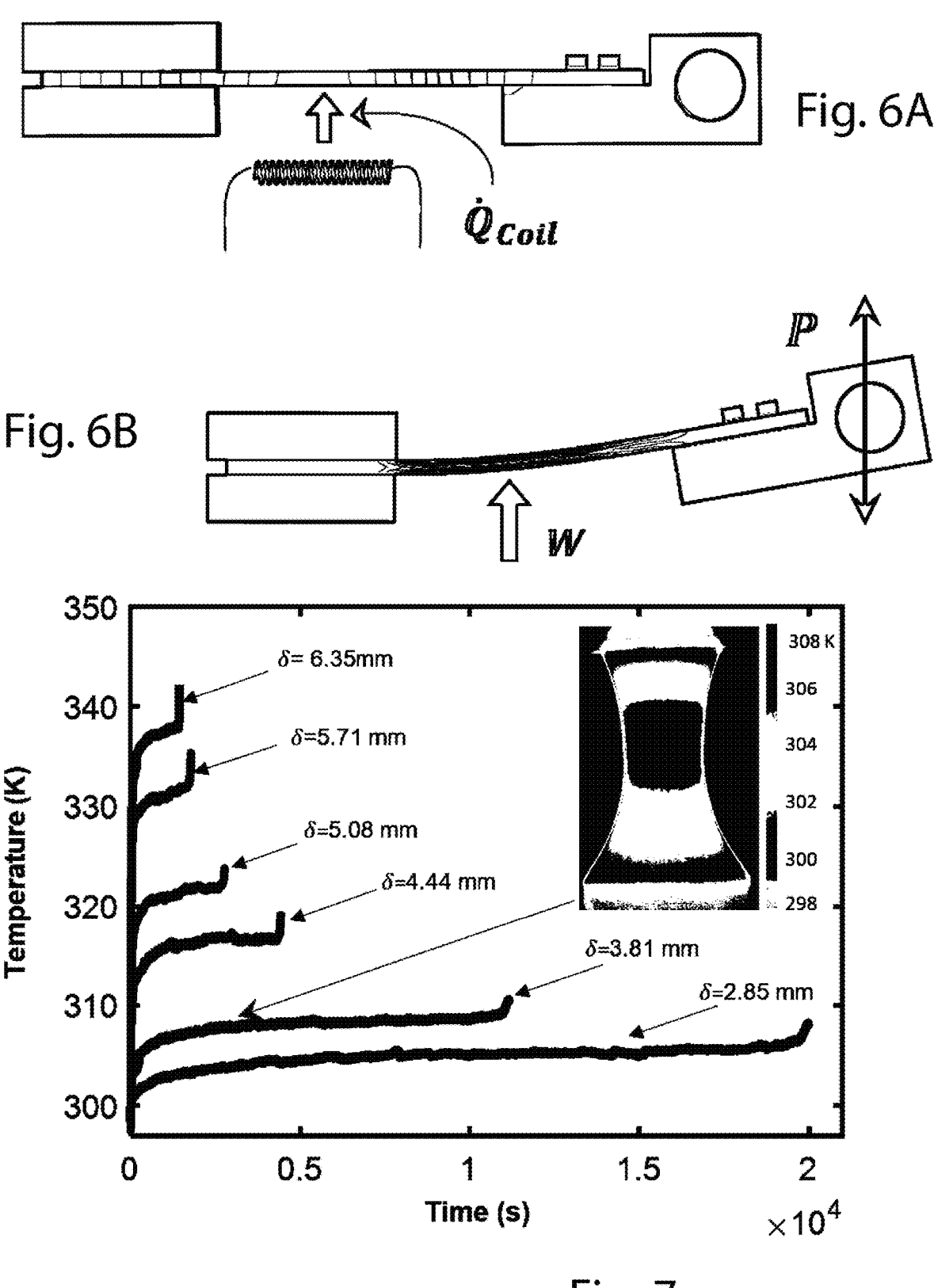
FIG. 6A depicts a bending test specimen attached to a bending fatigue machine and the placement of a heating coil.
FIG. 6B depicts a bending test specimen being bent by a bending fatigue machine.
FIG. 7 depicts maximum surface temperature evolution for bending fatigue tests with different displacement levels.

A bending test specimen as depicted in FIG. 3 may be fatigued in a bending fatigue machine as depicted in FIGS. 4 and 5 causing a cyclic deformation as depicted in FIG. 6B. The specimen is clamped at both ends, and an actuation force Facts in a cyclic manner on one end of the specimen at a specified displacement $\delta$. Based on the first law of thermodynamics, the rate of internal energy change, $\dot{U}$, is equal to the rate of work, $\dot{W}$, done on the system minus the energy rate, $\dot{Q}$, exiting the control volume.

$$\dot{U} = \dot{W} - \dot{Q} \tag{1}$$

The second law of thermodynamics predicts that the change in the system's entropy, due to change of state, is greater or equal to the heating rate divided by temperature.

$$dS \geq \frac{\partial Q}{T} \tag{2}$$

This inequality can be written as an entropy balance equation by adding an extra term of $d_iS$, which denotes internal entropy generation.

$$dS = d_eS + d_iS \tag{3}$$

In Eq. 2, $$\frac{\partial Q}{T}$$

is replaced with $d_eS$, to derive Eq. 3. $d_eS$ is referred to as entropy flow. The Clausius-Duhem inequality provides the following expression for characterizing the entropy generation.

$$\dot{S}_i = \frac{1}{T}\sigma : \dot{\varepsilon}_p - \frac{1}{T}A_k\dot{v}_k - \frac{1}{T^2}q \cdot gradT \geq 0 \tag{4}$$

The stress tensor and plastic strain rate are shown by $\sigma$ and $\dot{\varepsilon}_p$, respectively. $v_k$ are the internal variables and their associated conjugate thermodynamic forces denoted by $A_k$. q is the heat flux and T is the absolute temperature. In many metals, the term $A_k\dot{v}_k$ is relatively small and entropy generation due to heat production, $$\frac{1}{T^2}q.$$

gradT, has been shown to be negligible. The plastic deformation term $$\left(\frac{1}{T}\sigma : \dot{\varepsilon}_p\right)$$

may be considered dominant in low-cycle fatigue. With these considerations, the entropy generation Eq. 4 simplifies considerably to the following.

$$\dot{S}_g = \frac{\dot{w}_p}{T} \tag{5}$$

where $\dot{w}_p = \sigma : \dot{\varepsilon}_p$ represents the heat generation per unit volume.

The accumulated entropy from the start of the cyclic actuation $t=t_0$ to the onset of fracture, when $t=t_f$ is:

$$FFE = \int_0^{t_f} \frac{\dot{w}_p}{T} dt \tag{6}$$

where FFE is the so-called fracture fatigue entropy.

FFE is a material parameter, independent of the type of loading or specimen geometry, and remains roughly the same for elevated environmental temperatures up to 200° C. If FFE is known, then the number of cycles to failure can be estimated. The following equation gives the relation between the number of cycles to failure and the fracture fatigue entropy.

$$FFE = \frac{\dot{w}_p}{T_s}t_f = \frac{N_f\dot{w}_p}{fT_s} \tag{7}$$

Thus, if $\dot{w}_p$ and $T_s$ are known, Eq. 7 can be used to estimate $N_f$. However, determining the rate at which energy is dissipated from the specimen during fatigue is a challenge in the energy-based approaches.

In what follows, two methods for evaluating $\dot{w}_p$ are discussed. One is based on the so-called $R_\theta$ method, which provides a relationship between the slope of the measured temperature rise at the beginning of the fatigue test and $\dot{w}_p$. The other experimentally determined $\dot{w}_p$ based on the cooling characteristics of the specimen after attaining steady-state.

Evaluation may be done on a control volume which may be the narrow portion of the specimen depicted in FIG. 3. Equation 1 may be applied to a control volume, V, and may be written as follows.

$$\int_V \left(\oint (\sigma_{ij}d\varepsilon_{ij})\right) \cdot f \cdot dV = \int_V -k \cdot \nabla^2 T \cdot dV + \int_{S_{cv}} h(T - T_0) \cdot dS_{cv} + \tag{8}$$

$$\int_{S_{rd}} e \cdot \beta(T^4 - T_0^4) \cdot dS_{rd} + \int_V \left(\rho.c.\frac{\partial T}{\partial t}\right)dV$$

where $S_{cv}$, $S_{cd}$ and $S_{rd}$ represent the surface areas through which convection, conduction and radiation take place. The first three terms on the right-hand side of Eq. 8 give the dissipated heat from the control volume through conduction, convection, and radiation, and the last term is the variation of internal energy. $\beta$ stands for the Stephan-Boltzmann constant and e is the emissivity. c is the specific heat capacity and p is the density of the material. $T_0$ is the ambient temperature, h is the convective heat transfer coefficient, and f is frequency.

If the specimen is assumed to have a uniform cross-section in the gauge section, Eq. 8 can be written as $$\frac{\partial^2 \theta}{\partial z^2} - m^2\theta + \frac{\dot{w}_p}{k} = \frac{1}{k}\frac{\partial \theta}{\partial t} \tag{9}$$

where $\theta = T - T_0$, l is the length of the specimen, k represents the thermal conductivity, and $$m^2 = (h + 4e\gamma T_a^3)p / Ak.$$

The cross-sectional area is denoted by A and p is the perimeter of the cross-section area.

The boundary conditions assumed are zero temperature rise at the two ends of the specimen, $\theta(z=0, t)=\theta(z=l, t)=0$, and zero temperature rise at the beginning of the test $\theta(z, t=0)=0$. The solution to Eq. 9 is:

$$\theta = 2\frac{\dot{w}_p}{m^2 k}\sum_{n=1}^{\infty}C_n\sin\left(\frac{n\pi}{L}z\right)e^{-\left[\left(\frac{n\pi}{l}\right)^2+m^2\right]\frac{k}{\rho c}t} + \tag{10}$$

$$\frac{\dot{w}_p}{m^2 k}\left[\frac{\sinh\left[m(z-l)\right]-\sinh\left(mz\right)}{\sinh\left(ml\right)}+1\right]$$

where $$C_n = -\left[\frac{1}{n\pi}-\frac{n\pi}{(n\pi)^2+l^2 m^2}\right][1-(-1)^n]$$

It is possible to find the derivative of temperature rise at the beginning of the loading in the center of the specimen, $$R_\theta = \frac{\partial T}{\partial t}|_{t=0,z=L/2}.$$

$$R_\theta = \frac{\partial T}{\partial t}|_{t=0,z=L/2} = \frac{\dot{w}_p}{\rho c} \tag{11}$$

Eq. 11 can be solved for $\dot{w}_p$ which gives:

$$\dot{w}_p = \rho c R_\theta \tag{12}$$

Now, consider the time t=t' when the steady-state prevails and external actuation is suddenly interrupted. Right after stopping the test, there would be no heat generation source in the material, and the specimen starts to cool down. The temperature distribution along the specimen's length just before stopping the test is given as $\theta_e(z)$.

Solving Eq. 9 with boundary conditions $\theta(z=0, t)=\theta(z=l, t)=0$ and $\theta(z,t=0)=\theta_e(z)$ yields:

$$\theta(z, t) = -2\frac{\dot{w}_p}{m^2 k}\sum_{n=1}^{\infty}C_n\sin\left(\frac{n\pi}{l}z\right)e^{-\left[\left(\frac{n\pi}{l}\right)^2+m^2\right]\frac{k}{\rho c}t} \tag{13}$$

The cooling curve slope for z=l/2 at time t=t* is:

$$R_c = -\frac{\partial\theta}{\partial t}|_{z=\frac{l}{2},t=t^*} = \frac{\dot{w}_p}{\rho c} \tag{14}$$

The energy production rate may be evaluated by externally heating a stationary specimen to simulate the equivalent steady-state temperature profile of a cyclically loaded specimen. The relation between the power of the external heat source and the induced temperature on the specimen may be used to find the energy dissipation rate when the heat generation source term is acting within the specimen, i.e. $\dot{w}_p$.

Consider a simple geometry of a flat rectangular bar. A two-dimensional solution of the heat conduction equation with an internal heat generation $\dot{w}_p$ (per volume per second) with both ends maintained at ambient temperature is given by Eq. 15. Example Set B describes the relevant derivation.

$$\theta = \dot{w}_p\sum_{n=1}^{\infty}C_{n1}\sin\left(\frac{n\pi}{l}x\right)\cosh\left(\frac{n\pi}{l}z\right)-\frac{\dot{w}_p l^2}{2k}\left(\left(\frac{x}{l}\right)^2-\left(\frac{x}{l}\right)\right) \tag{15}$$

$$C_{n1} = \frac{\frac{l^2}{k}\frac{2h}{n^3\pi^3}((-1)^n-1)}{\frac{n\pi}{l}k\sinh\left(\frac{n\pi}{l}\frac{a}{2}\right)+h\cosh\left(\frac{n\pi}{l}\frac{a}{2}\right)} \tag{16}$$

where 1 and a are the length and thickness of the bar, respectively, x is the longitudinal coordinate on the specimen, and z is the coordinate in the thickness direction. h stands for convection heat transfer coefficient, and k is the thermal conductivity.

The solution of the heat conduction equation for the same geometry exposed to an external heat flux q" from below, but without an internal heat generation is:

$$\theta = q''\sum_{n=1}^{n=\infty}C_{n2} \tag{17}$$

$$\left(\exp\left(\frac{n\pi}{l}z\right)+\frac{\exp\left(\frac{n\pi a}{l}\right)\left(\frac{k}{h}\left(\frac{n\pi}{l}\right)+1\right)}{\left(\frac{k}{h}\left(\frac{n\pi}{l}\right)-1\right)}\exp\left(-\frac{n\pi}{l}z\right)\right)\sin\left(\frac{n\pi}{l}x\right)$$

$$C_{n2} = \frac{\frac{-4}{n\pi h}\left(\sin\left(\frac{n\pi}{2}\right)\right)^2\left(\frac{k}{h}\left(\frac{n\pi}{l}\right)-1\right)}{\exp\left(-\frac{n\pi a}{2l}\right)\left(\frac{k}{h}\left(\frac{n\pi}{l}\right)-1\right)^2-\exp\left(\frac{3n\pi a}{2l}\right)\left(1+\left(\frac{n\pi}{l}\frac{k}{h}\right)^2\right)} \tag{18}$$

The maximum temperature in both cases occurs at the mid-section of the specimen $$\left(x = \frac{l}{2}\text{ and }z = \frac{a}{2}\right).$$

To have the same maximum temperature, the value of $\theta$ from Eq. 15 and Eq. 17 is equated at $$z = \frac{\alpha}{2}.$$

Eq. 19 shows the ratio of the heat flux q" to $\dot{w}_p$ that must hold.

$$\frac{q''}{\dot{w}_p} = \frac{\sum_{n=1}^{\infty}C_{n1}\sin\left(\frac{n\pi}{2}\right)\cosh\left(\frac{n\pi a}{2l}\right)+\frac{l^2}{8k}}{\sum_{n=1}^{n=\infty}C_{n2}\exp\left(\frac{n\pi a}{2l}\right)\left(\frac{\frac{2k}{h}\left(\frac{n\pi}{l}\right)}{\left(\frac{k}{h}\left(\frac{n\pi}{l}\right)-1\right)}\right)\sin\left(\frac{n\pi}{2}\right)} \tag{19}$$

To gain insight into how external heating instead of volumetric heat generation affects the surface temperature, let us consider a rectangular bar with a length of l=5 cm and thickness of a=3 mm. Assuming h=20 W/mK and k=54 W/m²K, using Eq. 19, we obtain $$\frac{q''}{\dot{w}_p} = 3.016 \times 103 \text{ m.}$$

Figure 2:
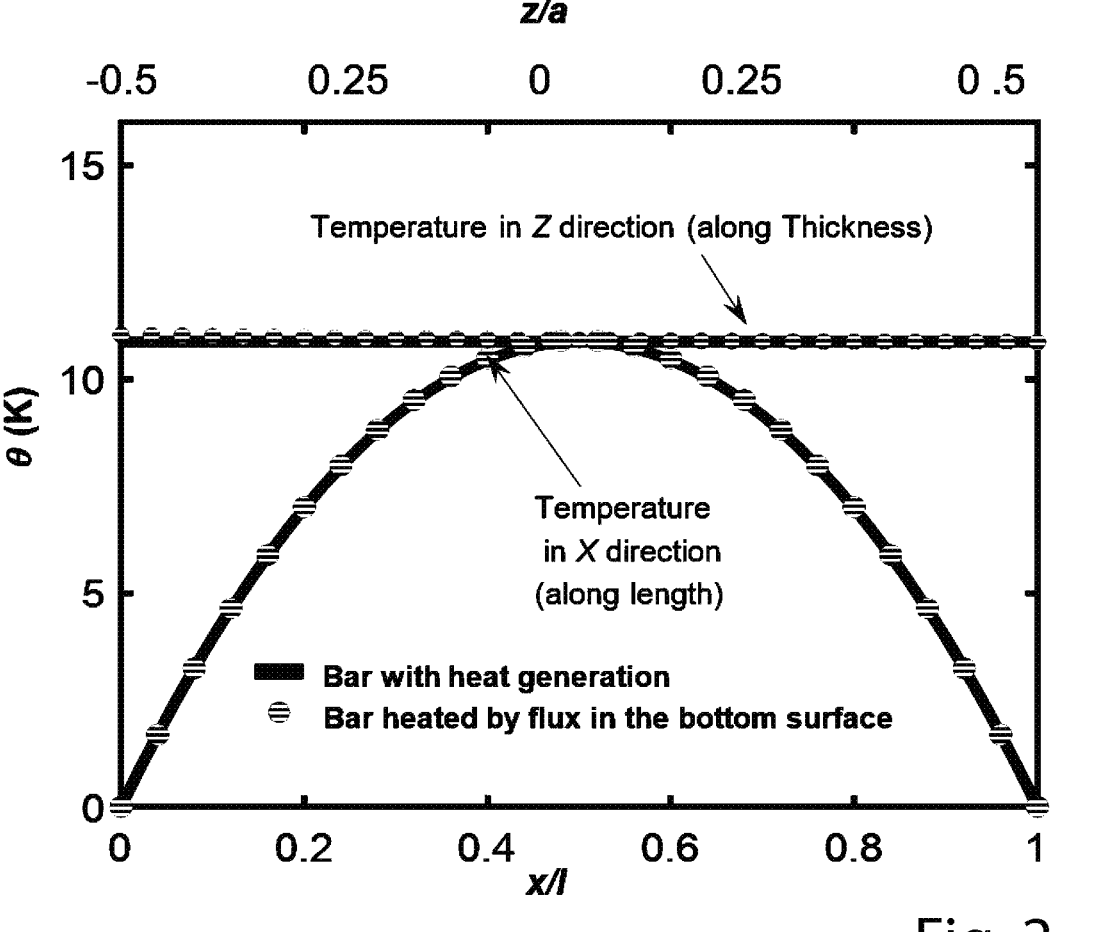
FIG. 2 is a plot of temperature rise against location on a specimen.

To illustrate, let us assume that volumetric heat generation is $\dot{w}_p$=2 MJ/m$^3$s. This means that a heat flux of magnitude q″=6032 W/m$^3$ must be externally supplied to have the same maximum temperature rise compared to a bar with heat generation 2 MJ/m$^3$s. The profiles of temperature rise along the length of the specimen in both cases are shown in FIG. 2. FIG. 2 depicts Temperature rise, θ, distribution along the length and in the thickness direction of a bar of length 5 cm, thickness of 3 mm and conductivity of k=54 W/mK subjected to heat flux and the same bar with internal heat generation both in air with h=20 W/m$^2$K. FIG. 2 shows that if the maximum temperature for both cases is the same, the surface profile is very close in all the points on the surface. The temperature rise in the thickness direction is also close when bar is heated with the volumetric heat generation or when exposed to an external heat source with constant heat flux. As expected, the temperature rise is slightly higher on the bottom surface when the specimen is heated externally.

In both equations 8 and 10, it is assumed that the air around the specimen has the same convective heat transfer coefficient. This assumption is valid for the cases where the heat generation within the material is responsible for the elevation of temperature, which is the case of fatigue tests. However, when the specimen is heated from one side, the air temperature is not the same on the top and bottom sides of the specimen. To investigate, the governing equation is solved with a convention coefficient $h_1$ on the top surface and $h_2$ on the bottom. The following relation, also shown in FIG. 16, gives the temperature rise in this case.

$$\theta = \sum_{n=1}^{n=\infty} \frac{\frac{-4}{n\pi} \frac{q''}{h_2} \left( \sin\left(\frac{n\pi}{2}\right) \right)^2}{\left( \exp\left(-\frac{n\pi a}{2l} \left(\frac{k}{h_2}\left(\frac{n\pi}{l}\right) - 1\right) - \left(\frac{\exp\left(\frac{n\pi a}{l}\right)\left(\frac{k}{h_1}\left(\frac{n\pi}{l}\right)+1\right)}{\left(\frac{k}{h_1}\left(\frac{n\pi}{l}\right)-1\right)}\right) \exp\left(\frac{n\pi a}{2l}\right)\left(1 + \left(\frac{n\pi}{l}\right)\frac{k}{h_2}\right) \right)}$$

$$\left( \exp\left(\frac{n\pi}{l}z\right) + \frac{\exp\left(\frac{n\pi a}{l}\right)\left(\frac{k}{h_1}\left(\frac{n\pi}{l}\right)+1\right)}{\left(\frac{k}{h_1}\left(\frac{n\pi}{l}\right)-1\right)} \exp\left(-\frac{n\pi}{l}z\right) \right) \sin\left(\frac{n\pi}{l}x\right) \quad (20)$$

To evaluate the error of replacing a heat source for generating correspondent surface temperature, we define $$e = \frac{\theta_{max-top\,surf}|_{q''} - \theta_{max-bottom\,surf}|_{q''}}{\theta_{max-bottom\,surf}|_{q''}}$$

where e is the difference between the temperature of the top and bottom surface of the specimen when the temperature is elevated by heat flux divided by the value of bottom surface temperature. Table 1 shows the percent of error e for different lengths of the bar, l=0.05 m, 0.5 m and 1 m with different a/l ratios. Referring to Table 1, Assuming that $h_2$=20 W/m$^2$K, the relative error e increases with the ratio a/l. It can be seen that for a/l<0.1, the error is less than 8%, even when the specimen length is 1 m long. The error increases with the length of the specimen and the ratio a/l; however, when the length l is below 0.1 and a/l<0.01 (which applies to the length and thickness to length ratio of specimen used in the present study), the error is less than one percent. Table 1 shows errors of top surface temperature estimation for $\theta_{max}$=1 K.

TABLE 1

| l (m) | a/l | $\dot{w}_p$ (MJ/m$^3$s) | q″ (J/m$^2$) | e(%) |
|---|---|---|---|---|
| 0.05 | 0.001 | 8.84 × 10$^5$ | 44.21 | 0.002 |
| | 0.01 | 2.40 × 10$^5$ | 120.06 | 0.060 |
| | 0.1 | 1.80 × 10$^5$ | 910.51 | 4.212 |
| 0.5 | 0.001 | 8.00 × 10$^4$ | 40.01 | 0.019 |
| | 0.01 | 8.84 × 10$^3$ | 44.25 | 0.206 |
| | 0.1 | 2.41 × 10$^3$ | 122.93 | 5.640 |
| 1 | 0.001 | 4.00 × 10$^4$ | 40.01 | 0.037 |
| | 0.01 | 4.11 × 10$^3$ | 41.19 | 0.380 |
| | 0.1 | 7.74 × 10$^2$ | 79.71 | 7.247 |

The specimens used for bending tests were made of LCS 1018 sheets cut by a water jet. All the test specimens were polished with sand papers, starting from grade 220 followed by 400, 600, and 1200 grits. The thickness of the test specimen was 3 mm. FIG. 3 shows the geometry of the specimen with measurements in millimeters. The mechanical properties and chemical composition of the steel used for testing are specified in Table 2 and Table 3, respectively.

TABLE 2

| Material | E (GPa) | $\sigma_0$ (MPa) | $k\left(\frac{W}{mK}\right)$ |
|---|---|---|---|
| 1018 Carbon steel | 205 | 370 | 51.9 |

TABLE 3

| Composition | Carbon | Manganese | Phosphorous | Silicon | Sulfur | Iron |
|---|---|---|---|---|---|---|
| 1018 Low-Carbon steel | 0.13-0.20% | 0.30-0.90% | 0.04% Max. | 0.15-0.30% | 0.50% Max. | remainder |

An LFE-150 bending fatigue test machine from Fatigue Dynamics, Michigan was used to perform fully reversed bending tests. The bending force is applied to the specimen through a reciprocating platen. The reciprocating movement is provided by a crank rotated by a variable speed motor as depicted in FIG. 5. The displacement is adjusted on the machine by rotating the connection point of the moving handle on the crank.

To measure the temperature of the specimen, a FLIR A615 infrared camera is used. The resolution is maximum at 640×480 pixels and accuracy is 50 mK. The camera is mounted on a platform at a distance of 20 cm from the surface of the specimen so that it can view the entire gauge length.

The external heat source is a heating coil made of a resistance wire mounted on a three-directional positioning stage as depicted in FIG. 5. The specimen and the coil are shown in greater detail in FIG. 6A. The distance of the coil to the bottom surface of the specimen is adjusted to 3 mm, and the centerline axis of the specimen and coil are kept parallel during heating for all the tests. To achieve the desired temperature distribution on the specimen, the coil is shifted to the right and left in the x-direction. The IR camera is mounted on a stand above the specimen and captures the surface temperature during the fatigue test and while it is heated by the heating coil. The heat source is made of a resistance wire made from Kanthal A1-24 AWG gauge spools. The diameter of the wire is 0.51 mm, and the resistance is 6.7 Ohms per meter. The coil has a 7 mm outer diameter and 25 mm length FIG. 6A.

For each displacement level δ, the steady-state temperature profile on the surface in the gauge section is captured. To produce the same temperature profile on the surface with the external heating source, the coil is moved in the x-direction while its axis is kept parallel to the axis of the centerline of the specimen. The distance between the coil and the bottom surface of the specimen is constant (position in the z-direction). It is only necessary to determine the proper location of the coil for one displacement level, δ. Subsequently, the settings will remain unchanged for all other displacement levels. Hence, each temperature profile for different displacement levels is produced by only changing the voltage of the power supply.

FIG. 4 shows a schematic of the set up used for the experiment consisting of the bending fatigue machine and external heating unit monitored by an IR camera located on the top surface of the specimen under fatigue loading including control box 101, variable speed motor 103, infrared camera 106, crank 108, power supply 113, and computer 116. FIG. 5 shows another view of the experimental configuration indicating reciprocation direction 122, specimen 123, Z direction setting 126, X direction setting 128, Y direction setting 130, heating coil 133, and connections to power supply 136. The heater may be mounted on a three-directional positioning table placed underneath the stationary specimen in the bending fatigue machine.

FIGS. 6A-6B show the schematic of the specimen subjected to heating produced by the external source and under equivalent fatigue respectively. The regions of the specimen that experience higher thermal dissipation are close to the clamped end, as illustrated with isothermal lines in FIG. 6A. In comparison, the temperature rise is higher in the region of the specimen close to the heating coil in FIG. 6B. The lines show the location of high temperature in the specimen compared with the lower temperature areas, i.e. the ambient temperature, at the ends of the specimens. In FIG. 6A the hottest area is over the center of the coil. In FIG. 6B the hottest areas are at the top and bottom surfaces of the specimen closest to the center.

Once the DC electric current passes through the heating coil wire, heat is emitted from the coil to the surrounding environment. A portion of this heat is absorbed by the specimen and the rest is dissipated to the environment. The ratio of heat transferred to the specimen from the coil is given by $F_{12}$. The induced heat generation term from the coil is given by:

$$\dot{w}_p = \frac{F_{12}UI}{V} = \beta P \qquad (21)$$

where U is the electric potential difference of the two ends of connection wires on the heating coil, and I is the electric current. V stands for the volume of specimen generating heat. $F_{12}$ represents the radiation view factor between the coil and the specimen. The ratio $$\frac{F_{12}}{V}$$

is replaced by β, and the power is P=U I.

Using Eq. 7 one can find the number of cycles to failure as $$N_f = \frac{FFEfT_s}{\dot{w}_p}$$

and by substituting βP for $\dot{w}_p$ from Eq. 21, the fatigue life is determined using Eq. 22.

$$N_f = FFE\frac{fT_s}{\beta P} \qquad (22)$$

To find $N_f$, the parameter β must be determined. For a given specimen, only one test is needed to determine β since it can be assumed that its value remains constant for different displacement amplitudes.

The maximum surface temperature evolution is depicted in FIG. 7 for the bending fatigue tests with different displacement levels, δ. The maximum temperature occurs on the surface of the specimen in the gauge section around 21 mm from the clamped end. The location of the maximum temperature remains nearly the same for different tests. The three distinct phases of temperature evolution are seen for each level. As expected, it is observed that the steady-state temperature rise increases with the displacement level. It is also seen that the temperature elevates abruptly just before the final fatigue fracture. The temperature rise reaches as high as 40° C. for the highest displacement level (shortest specimen life), while the steady-state temperature rise is around 10 degrees for the smallest displacement level. Also shown is the thermal image of the specimen at steady-state under cyclic displacement of δ32 3.81 mm with the maximum temperature of 308 K.

Figure 8A:
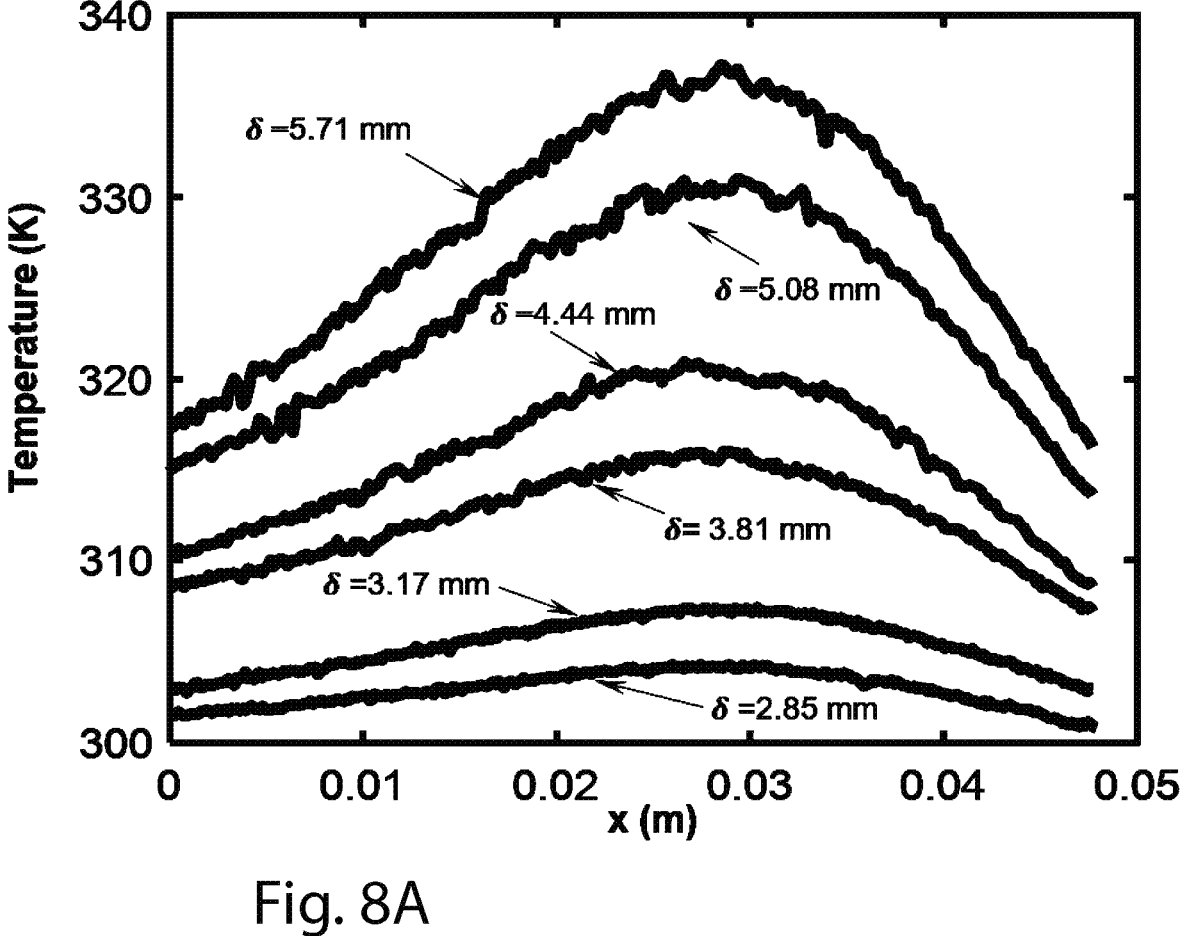
FIG. 8A depicts surface steady-state temperature profiles for bending fatigue tests at different levels of bending displacement.
Figure 8B:
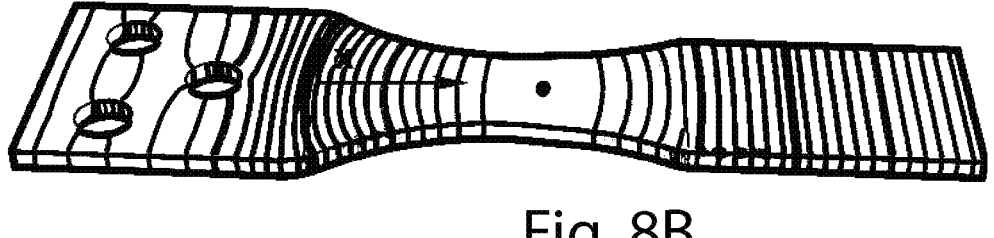
FIG. 8B depicts isothermal lines on a specimen.

FIG. 8A depicts the surface steady-state temperature profile in the gauge section for bending fatigue tests subjected to different levels of bending displacement (δ). FIG. 8B depicts isothermal lines on a specimen corresponding to the steady-state temperature profiles of FIG. 8A. As the displacement level increases, the surface temperature rises.

This figure shows that the temperature at the two ends changes for different tests, but the location where the temperature is maximum is roughly constant. The temperature distribution of FIG. 8A is due to heat dissipation during fatigue. These profiles of temperature can be produced by an external heat source, as discussed in the following.

Figures 9, 10:
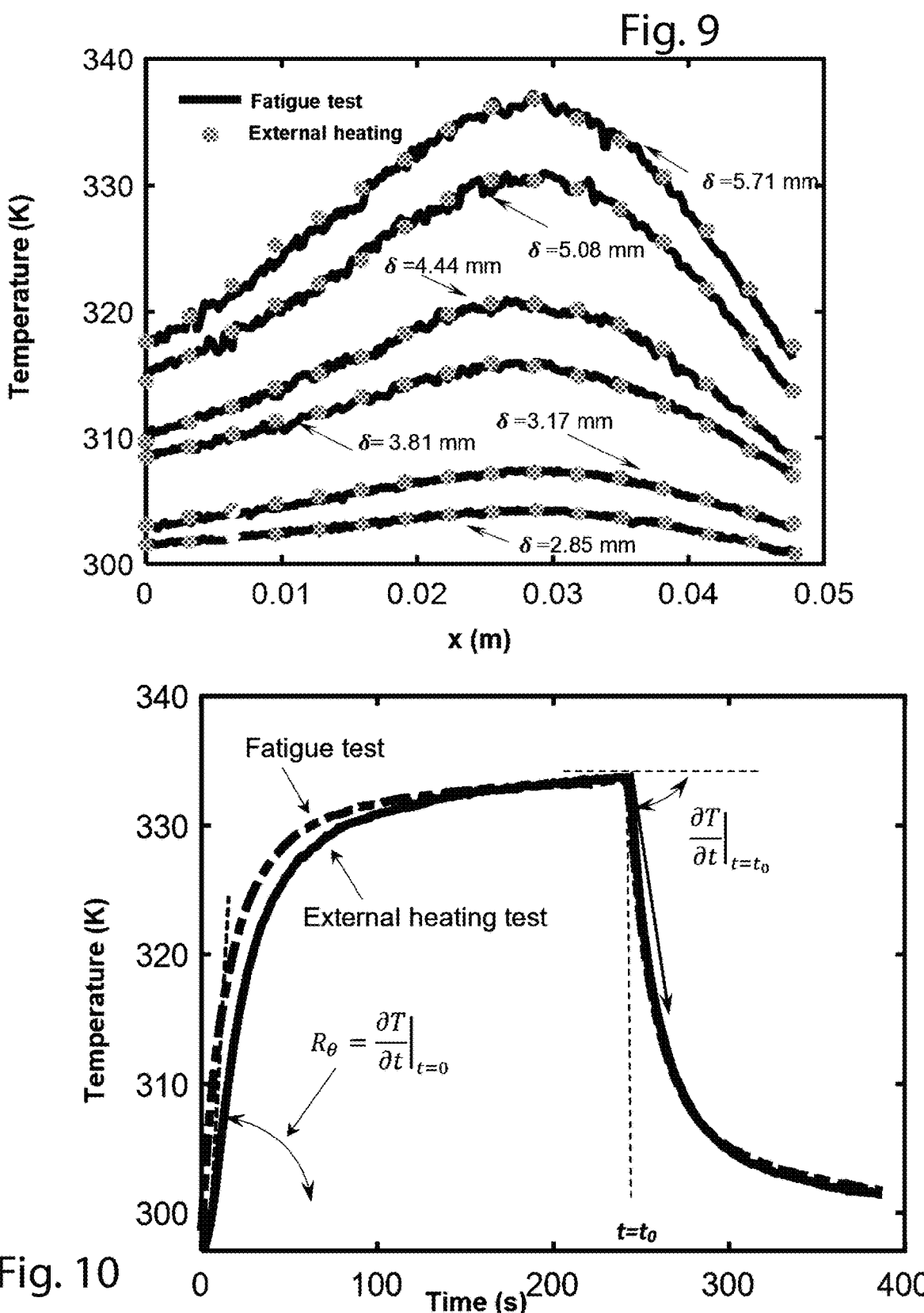
FIG. 9 shows the surface temperature of the specimen acquired during the fatigue tests and the temperature generated by the heating coil.
FIG. 10 shows the time and temperature similarity of external heating and fatigue tests.

FIG. 9 shows the surface temperature of the specimen acquired during the fatigue tests and the temperature generated by the heating coil. As observed in FIG. 8 the temperature rise in the two ends of the gauge section changes for different tests. For instance, comparing the temperature profiles of the tests with $\delta$=5.71 mm and $\delta$=2.85 mm, it is seen that the specimen's steady-state temperature difference for these two tests at the clamped end (x=47 mm) is around 16 K while the maximum temperature difference (which happens at x=28 mm) is 30 K. FIG. 9 shows that the temperature profile due to fatigue can be replicated with reasonable accuracy by external heating of the specimen. Heating was done using a coil positioned under the specimen and heated by a DC power supply as depicted in FIG. 6A.

The coil voltage, current, and the supply power needed to replicate the surface temperature profile of fatigue are given in Table 4 for different displacement levels. As expected, power increases with displacement level. Table 4 shows coil voltage, current, and power for tests with different displacement levels.

TABLE 4

| Test # | Test displacement $\delta$ (mm) | Coil voltage U (volt) | Coil current I (Amp) | Coil power consumption P (Watt) (P = VI) | $\beta$ ($m^{-3}$) |
|---|---|---|---|---|---|
| 1 | 2.85 | 2.81 | 1.20 | 3.36 | $14.79 \times 10^4$ |
| 2 | 3.17 | 3.50 | 1.58 | 5.56 | $14.46 \times 10^4$ |
| 3 | 3.81 | 5.50 | 2.33 | 12.81 | $14.32 \times 10^4$ |
| 4 | 4.44 | 6.75 | 2.94 | 19.84 | $14.84 \times 10^4$ |
| 5 | 5.08 | 8.11 | 3.45 | 27.97 | $15.31 \times 10^4$ |
| 6 | 5.71 | 8.91 | 3.96 | 35.24 | $14.86 \times 10^4$ |

Test number 6 is used for the purpose of illustrating how the value of $\beta$ is determined. The fatigue life, $N_f$, for Test 6 is 38,600 cycles. The FFE for LCS 1018 is reported to be 23 MJ $m^{-3}K^{-1}$. So, $\beta$ is found to be $14.72 \times 10^4$ $m^{-3}$. The value of $\beta$ is determined by completing one test since $N_f$ is needed to calculate $\beta$.

Now, suppose that we need to find the fatigue life of a component and that there is no chance of running a test up to failure. To solve this problem, the following method is used to determine $\beta$ based on the cooling curve slope method proposed by Ricotta et al. See M. Ricotta, G. Meneghetti, B. Atzori, G. Risitano, and A. Risitano, "Comparison of experimental thermal methods for the fatigue limit evaluation of a stainless steel," J Metals Materials International, vol. 9, no. 6, p. 677, 2019. FIG. 10 shows the results of two experiments. One is a typical fatigue experiment in which the cyclic loading is halted when the temperature becomes steady, and the other when the external heating source is removed from a stationary specimen after reaching the same temperature profile on the surface of Test 6. FIG. 10 shows that if the steady-state surface profiles in both cases are the same, then the rate at which the specimen cools is identical. Note that, referring to FIG. 10, the initial temperature rise is not the same in the fatigue test and external heating test. The reason is that the heating mechanism of the specimen is different in fatigue tests and external heating. For the external heating test, once the electric potential is applied to the coil, it takes time to reach the maximum temperature so the radiation from the coil can elevate the temperature of the specimen. However, in the fatigue test, the energy needed for temperature rise is directly delivered to the specimen by the mechanical work done on it. $\dot{w}_p$ can be found as:

$$\dot{w}_p = \rho c \frac{\partial T}{\partial t}\Big|_{t=t_0} \tag{23}$$

The initial temperature rise slope is also shown in FIG. 10. $\dot{w}_p$ can be found based on the initial temperature rise of fatigue test as:

$$\dot{w}_p = \rho c R_\theta \tag{24}$$

Using Eq. 23 in Eq. 21, one can find Eq. 25.

$$\beta = \frac{\rho c \frac{\partial T}{\partial t}\Big|_{t=t^*}}{P} \tag{25}$$

The parameter $\beta$ found from Eq. 25 using FIG. 10 is $14.86 \times 10^3$ $m^{-3}$ for Test #6. This value is close to what was calculated earlier as $14.72 \times 10^4$ $m^{-3}$ using the number of cycles for the fatigue test. The reported values for $\beta$ in Table 3 is based on Eq. 24.

As it is seen in Table 3, the value of $\beta$ changes only slightly from this value for different tests. This implies that if $\beta$ is found for one displacement level, it can be used for other values of displacement with small error.

Figure 11:
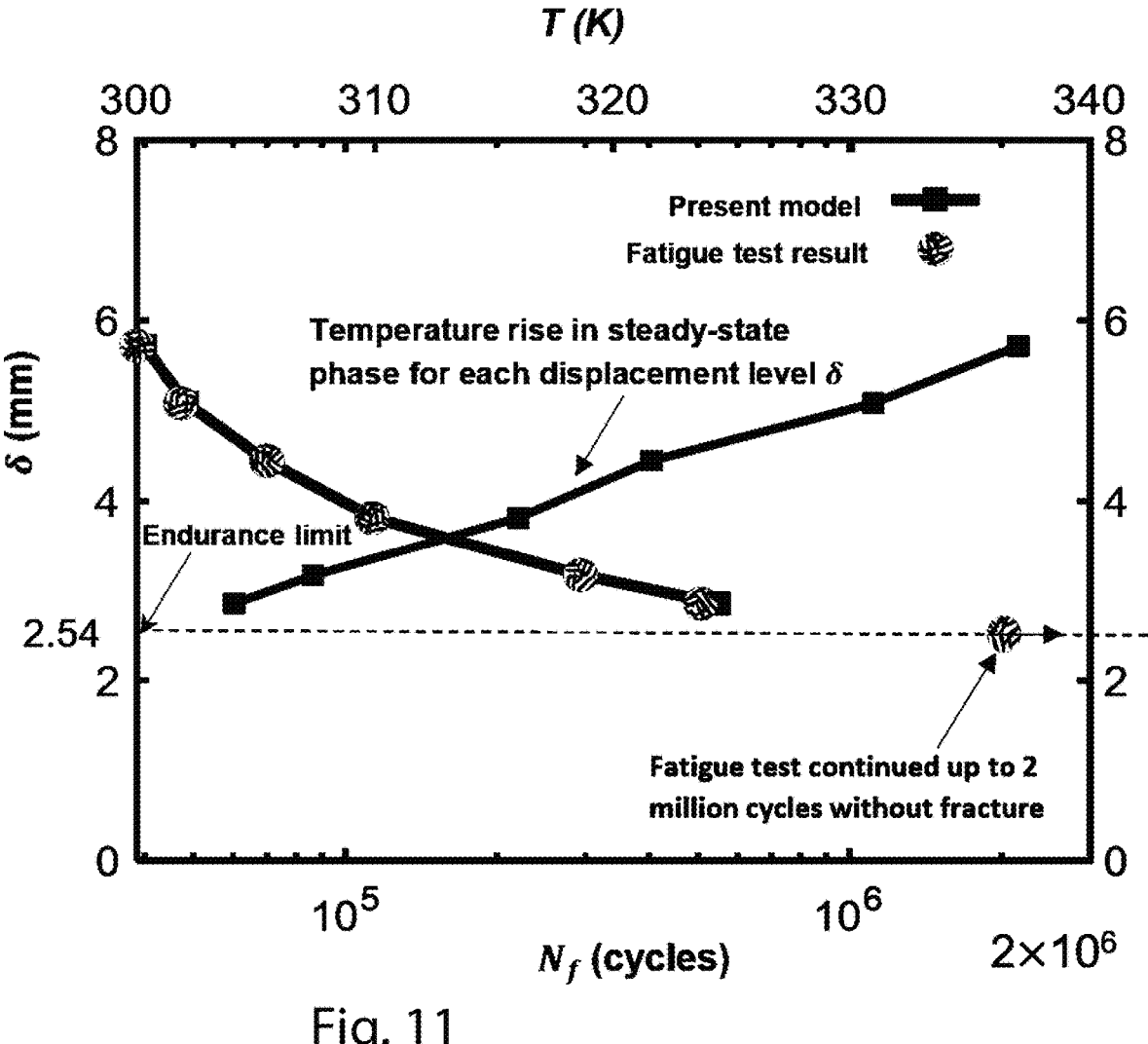
FIG. 11 shows the number of cycles to failure for different tests and the predicted life obtained using the external heating source approach.

FIG. 11 shows the number of cycles to failure for different tests and the predicted life obtained using the external heating source approach. The figure shows the displacement level versus fatigue life as cycles to failure. As expected, fatigue life decreases with the displacement level. It can be observed that the fatigue limit, where is the fatigue life is assumed to be infinite, is close to the displacement of $\delta$=2.54 mm. The predicted fatigue life shown in FIG. 11 was obtained at ambient operating conditions; however, the concept of FFE can be used for different environmental conditions temperatures. The material endurance limit is found to correspond to $\delta$=2.54 mm based on the test done under $\delta$=2.54 mm up to 2 million cycles without fracture. The temperature rise for each displacement level is shown by the black line and boxes rising from left to right.

Fatigue limit or endurance limit is conventionally defined as the stress below which the material can ideally undergo an infinite number of cycles without failure. Below the fatigue limit, the level of stress is less than what is needed for crack propagation, and, therefore, the specimen is not damaged. Research shows, however, that even at stresses below the fatigue limit, the specimen temperature can experience a small rise in temperature. In other words, when a material is subjected to cyclic loading, the heat generation as the result of plastic dissipation increases the temperature of the material. Heat generation is the result of reversible and irreversible phenomena in the material. The irreversible plastic dissipation in metallic structures is the reason for crack initiation and its subsequent propagation. The rest of the spent energy is dissipated as heat to the environment. This means that only a portion of the total dissipation energy spent on cyclic loading is accumulated in the form of internal energy, and this portion is responsible for damage and failure. According to damage accumulation theory, cyclic loading is responsible for the accumulation of micro cracks and microplastic deformation. The reason for this accumulative damage is the irreversibility of these dissipative processes. Referred to as internal friction, the non-damaging portion of energy dissipation should be properly accounted for since it does not participate in degrading the material. There are several reversible phenomena that take part in internal friction, including oscillation of dislocations, atoms that are caused by local defects in the lattice, or by the movement of dislocations. Since the energy dissipated below the endurance limit of fatigue is due to internal friction, this non-damaging dissipation has no role in degradation during fatigue. Non-damaging temperature evolution needs to be subtracted from the computation of thermal dissipation to obtain a realistic value of the fracture fatigue entropy.

Figures 12, 13:
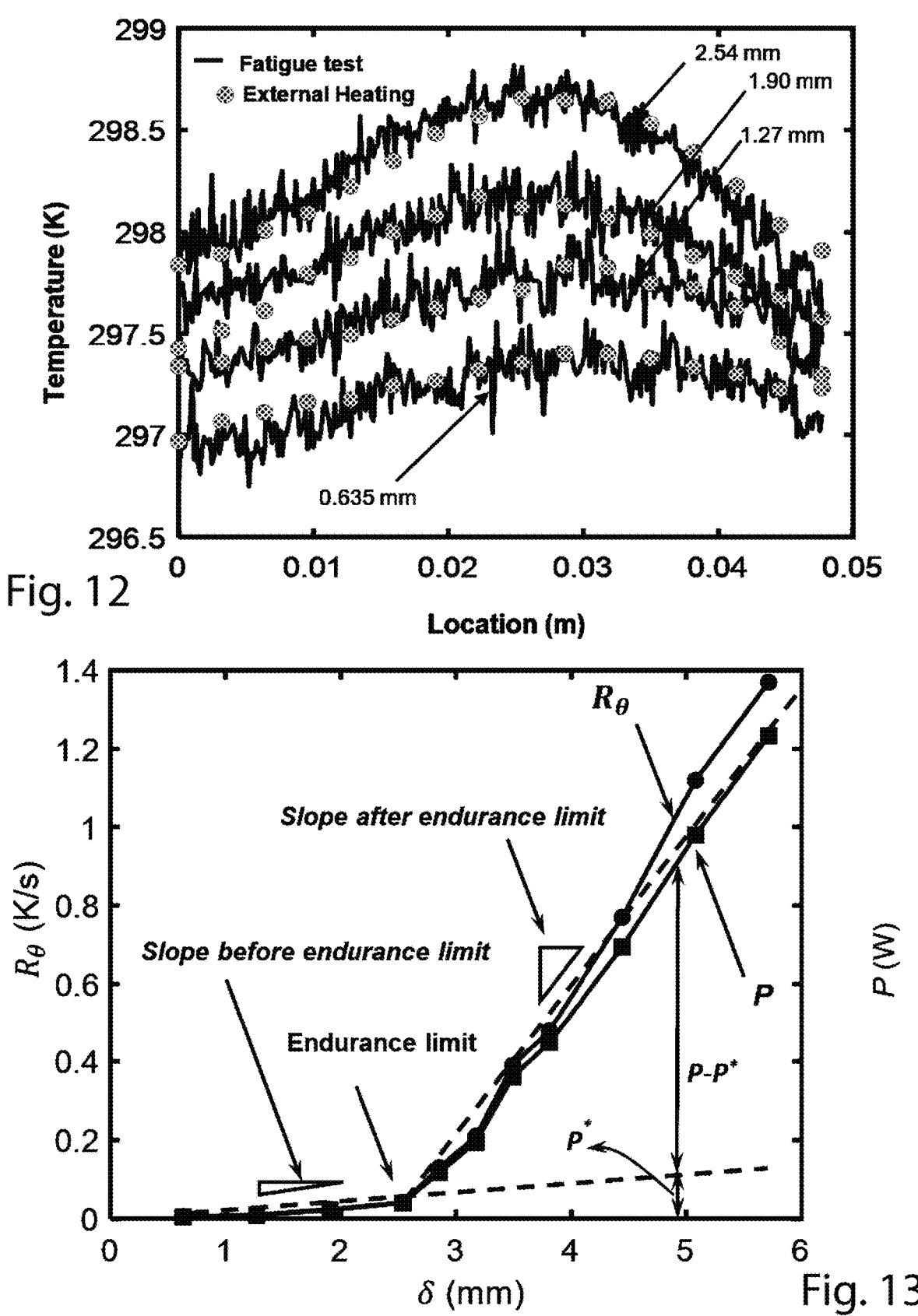
FIG. 12 shows temperature distributions for fatigue tests with comparable electric coil heating temperature distributions.
FIG. 13 shows the variation of electric power and initial temperature rise slope as a function of displacement level for a bending test.

Examination of the results of FIG. 12 shows that there exists a temperature rise even when the fatigue life is considered to be indefinite, i.e. when $\delta=2.54$ mm. FIG. 12 shows the temperature distribution for fatigue tests experiencing displacement level under fatigue limit for $\delta=0.635$, 1.9, 1.27, 1.90, and 2.54 mm and the matched profile of temperature generated by external heating using an external electric coil.

The presence of temperature rise even before the fatigue limit shows the applicability of the thermography approach for high-cycles fatigue. This is the non-damaging thermal manifestation of the fatigue process, which shows the effect of other mechanisms involved in thermal dissipation, including internal friction. Accordingly, a portion in the measured coil electric consumption pertaining to the non-damaging energy dissipation should be subtracted from the total measured coil power consumption.

Let P* denote the non-damaging portion of the power consumed by the heating coil. To find P*, The temperature profile on the surface of the specimen is captured with the displacement level corresponding to the fatigue limit. P* is the value of power consumption of heating coil to replicate the same profile of temperature as the one captured in steady-state phase of test at the fatigue limit. The sensitivity of the IR camera enables us to measure relatively small temperature rises even below the fatigue limit. This is seen in FIG. 12 that shows a measurable temperature rise for the displacement level of 0.635 mm generated by the external heat source with the power consumption of 0.125 Watt.

The measured value of P* for inducing temperature profile of FIG. 12 is found to be 0.8 W for the displacement level of 2.54 mm. The power is subtracted from the total power for each test in the process of finding the number of cycles of fatigue life. So, Eq. 22 is rewritten as follows.

$$N_f = FFE \frac{fT_s}{\beta(P - P^*)} \tag{26}$$

Since the temperature rise for the stress level of fatigue limit is needed to find P*, a number of quick tests are needed to determine the surface temperature profile for that stress level. For this purpose, $R_\theta$ is measured for the tests starting from small displacement levels and a change in the variation trend of $R_\theta$ is evaluated. FIG. 13 shows the variation of electric power P and initial temperature rise slope, Re, as a function of displacement level, $\delta$, for a bending test to find the fatigue strength based on the change in the slopes of $\delta$–P and $\delta$–$R_\theta$. The value of $R_\theta$ changes in two distinct regions in respect with $\delta$. The point of the boundary between these regions is $\delta=2.54$ mm, which can be attributed to the endurance limit shown earlier in FIG. 11.

Figure 14:
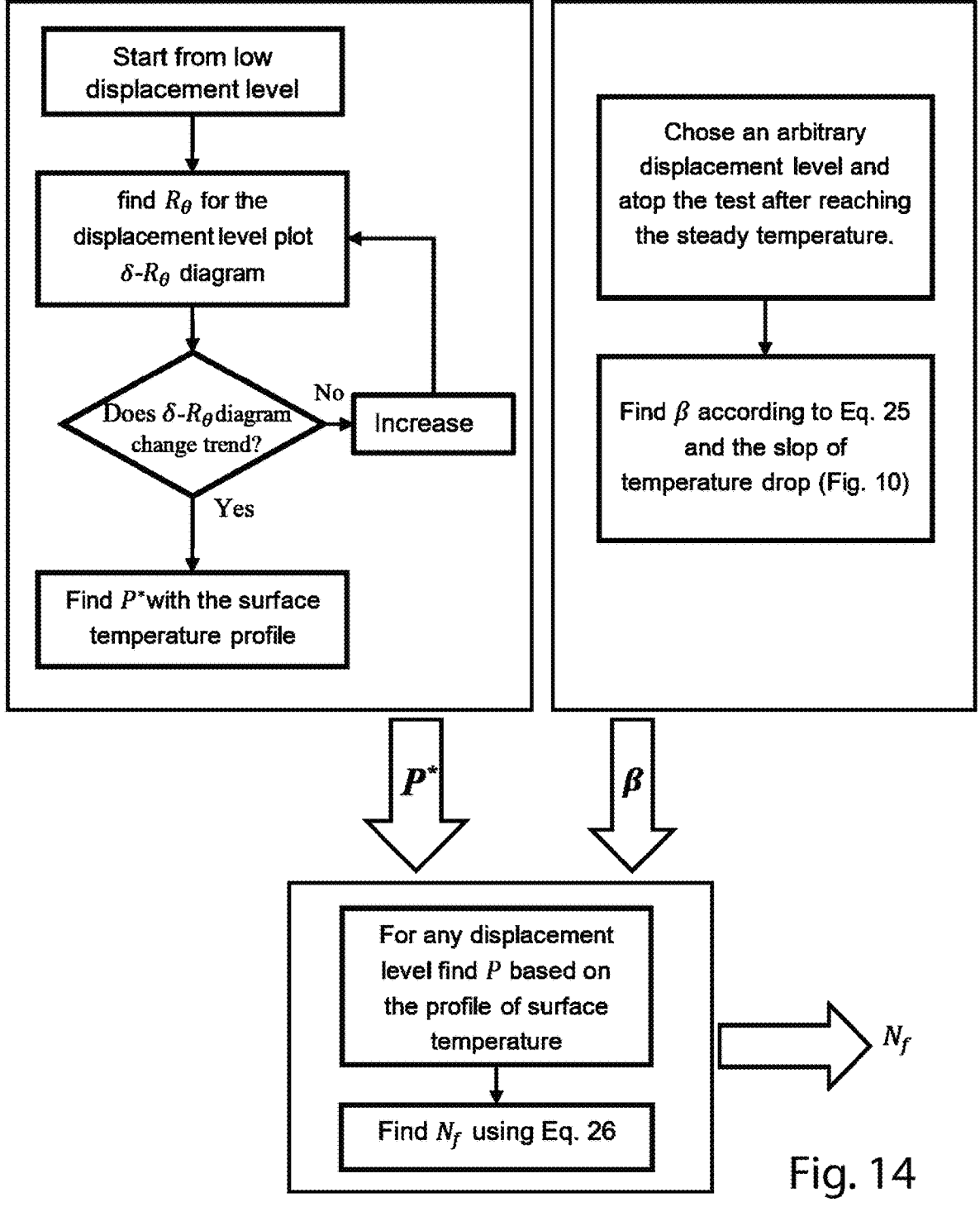
FIG. 14 shows a procedure for evaluating the life of a mechanical component.

FIG. 14 shows the steps needed to determine fatigue life. The procedure involves two main steps for determining P* and $\beta$. According to Table 3, the value of $\beta$ can be assumed constant for all the displacement levels, which makes it an easy task to find the fatigue life for different levels of displacement.

Based on the flowchart shown in FIG. 14, to find the fatigue life, one needs to start the experiment with small values of displacement. For each experiment, the initial slope of temperature rise is measured and recorded. This procedure is continued until a change in the diagram of $\delta$–$R_\theta$ is observed as it is shown in FIG. 13. The surface temperature profile of the point at which the $\delta$–$R_\theta$ curve show change in slope is used to find P*. The main assumption is that internal friction linearly increases with displacement level, and this is used to find P* as depicted in FIG. 13. Now to estimate the life of the specimen under an arbitrary displacement level, The specimen is heated with the coil, and once the surface profile reaches the steady-state temperature profile during fatigue, the values of electric current and voltage are recorded, and the coil is removed abruptly. The value of $\beta$ is calculated from Eq. 25 using the cooling curve of the specimen after the removal of the external heat source. Finally, the fatigue life is calculated according to Eq. 26, knowing the frequency of the tests and the value of FFE for the material used for the specimen.

To illustrate the efficacy of the present model, suppose that the fatigue life of a specimen subjected to a displacement of $\delta=3.50$ mm needs to be predicted. The predicted fatigue life based on FIG. 14 is 142,000 cycles. To validate, an experiment was conducted by setting $\delta=3.50$ mm on the fatigue machine. The initial slope of temperature rise is found to be $R_\theta=0.36$ K/s. After reaching steady-state, the experiment was halted, and the cooling rate was found to be $$\frac{dT}{dt} = 0.39 \text{ K/s.}$$

The voltage of the coil was 4.91V, the current was 2.12 A, $\beta=14.46\times10^4$ m$^{-3}$, and P*=1.73 W. The measured fatigue life was found to be 138,000 cycles, which is less than 3% error.

Based on the experiments conducted, an external heating source may be utilized to induce a surface temperature profile on a stationary specimen akin to what a specimen experiences under cyclic loading. The energy generation term is found by measuring the energy consumption of the external heating source. Then, by applying the concept of fracture fatigue entropy, FFE, one can easily predict fatigue life. The rate of temperature drop after stopping the fatigue test is equal to the rate of temperature drop after removing the external heater if the surface profiles are the same for the fatigue test and an externally heated specimen. The electrical power consumption of the external heat source for inducing the surface temperature profile can be used as a parameter to predict the plastic energy dissipation from a specimen under fatigue. There is a linear relationship between the electric power consumption of the heating coil and the dissipated energy for different tests with different stress levels. The power consumption of the external heating source to generate the temperature profile of the steady-state phase of fatigue varies in two distinct regions with respect to the bending displacement level and, consequently, the stress. According to the analytical solution of heat transfer in a rectangular beam, if the length of a bar is less than 0.5 m and the ratio of thickness to the length of the bar is below 0.01, the error related to the temperature recorded using external heating is less than 1 percent compared to the case when the bar is self-heated during the fatigue cycling.

This approach of utilizing an external heat source provides an opportunity to determine the fatigue life of a running test without stopping the operation. This means that the life of a mechanical component under fatigue loading can be found in two steps: first, the temperature distribution on the surface of the component under fatigue is captured. Next, the same temperature distribution is induced on the stationary specimen but with identical boundary conditions such as the same connections to the machine and same environment temperature. The predicted life from the present approach that examines the life by heating a stationary specimen is found to be in good agreement with actual fatigue tests where the specimen is cyclically actuated. Further, it is shown that the present approach can be used to determine the fatigue limit of a specimen by examining the power-displacement graph.

Example Set B

FIG. 15 depicts heat transfer from a two-dimensional bar subjected to heat flux from the bottom including: specimen 400, Z direction 403, X direction 406, zero temperature rise end points 410, Bottom heat flux 420, specimen thickness 423, unit width 426, specimen length 428, high temperature region 433, moderate temperature regions 436, lower temperature regions 438, isothermal lines 443, first convection coefficient 450, second convection coefficient 453, and heat dissipation directions 456. The two ends are maintained at room temperature and convection on the top and bottom surfaces. The length of the bar is represented by I, and it has t as a thickness value.

The 2D heat transfer equation is:

$$\frac{\partial^2 \theta}{\partial x^2} + \frac{\partial^2 \theta}{\partial z^2} = 0 \qquad \text{(Eq.B.1)}$$

where $\theta$ is temperature rise, i.e. $\theta = T - T_0$.

Using the separation of variables approach, one arrives at the following solution for the temperature distribution.

$$\theta = \sum_{n=1}^{\infty} \left( B_n \cos\left(\frac{n\pi}{l}x\right) + C_n \sin\left(\frac{n\pi}{l}x\right) \right) \left( E_n \exp\left(\frac{n\pi}{l}z\right) + D_n \exp\left(-\frac{n\pi}{l}z\right) \right) \qquad \text{(Eq.B.2)}$$

Applying boundary condition at the two ends $\theta|_{x=0} = \theta|_{x=l} = 0$ gives $B_n = E_n = 0$.

$$\theta = \sum_{n=1}^{\infty} C_n \sin\left(\frac{n\pi}{l}x\right) \left( \exp\left(\frac{n\pi}{l}z\right) + D_n \exp\left(-\frac{n\pi}{l}z\right) \right) \qquad \text{(Eq.B.3)}$$

$C_n$ and $D_n$ are constants. $D_n$ is found by applying boundary conditions $$k/h \frac{\partial \theta}{\partial z}\bigg|_{z=-\frac{t}{2}} = \theta$$

on the top surface. Only a single heat transfer coefficient is used. The result is:

$$D_n = \frac{\exp\left(\frac{n\pi a}{l}\right)\left(\frac{k}{h}\left(\frac{n\pi}{l}\right)+1\right)}{\left(\frac{k}{h}\left(\frac{n\pi}{l}\right)-1\right)} \qquad \text{(Eq.B.4)}$$

The second boundary condition on the bottom surface is $$k/h \frac{\partial \theta}{\partial z}\bigg|_{z=-\frac{t}{2}} = -q''/h + \theta.$$

$$C_n \sin\left(\frac{n\pi}{l}x\right) \qquad \text{(Eq. B.5)}$$

$$\left( \exp\left(-\frac{n\pi t}{2l}\right)\left(\frac{k}{h}\left(\frac{n\pi}{l}\right)-1\right) - D_n \exp\left(\frac{n\pi t}{2l}\right)\left(1+\left(\frac{n\pi}{l}\right)\frac{k}{h}\right) \right) = -q''/h$$

Rewriting and using Fourier series $$\sum_{n=1}^{\infty} -\frac{4}{n\pi}\frac{q''}{h}\left(\sin\left(\frac{n\pi}{2}\right)\right)^2 \sin\left(\frac{n\pi}{l}x\right)$$

instead of constant—$q''/h$ gives:

$$C_n = \frac{-\frac{4}{n\pi}\frac{q''}{h}\left(\sin\left(\frac{n\pi}{2}\right)\right)^2\left(\frac{k}{h}\left(\frac{n\pi}{l}\right)-1\right)}{\exp\left(-\frac{n\pi a}{2l}\right)\left(\frac{k}{h}\left(\frac{n\pi}{l}\right)-1\right)^2 - \exp\left(\frac{3n\pi a}{2l}\right)\left(1+\left(\frac{n\pi}{l}\right)\frac{k}{h}\right)^2} \qquad \text{(Eq. B.6)}$$

FIG. 15 shows 2D heat transfer of a bar with a first convection coefficient 450 and a second convection coefficient 453 represented by $h_1$ and $h_2$ respectively.

The 2D heat transfer equation is:

$$\frac{\partial^2 \theta}{\partial x^2} + \frac{\partial^2 \theta}{\partial z^2} = 0 \qquad \text{(Eq. B.7)}$$

where $\theta$ is temperature rise, i.e. $\theta = T - T_0$.

Using the separation of variables approach, one arrives at the following solution for the temperature distribution.

$$\theta = \sum_{n=1}^{\infty} \left( B_n \cos\left(\frac{n\pi}{l}x\right) + C_n \sin\left(\frac{n\pi}{l}x\right) \right) \qquad \text{(Eq. B.8)}$$

$$\left( E_n \exp\left(\frac{n\pi}{l}z\right) + D_n \exp\left(-\frac{n\pi}{l}z\right) \right)$$

Applying boundary condition at the two ends $\theta|_{x=0} = \theta|_{x=l} = 0$ gives $B_n = E_n = 0$.

$$\theta = \sum_{n=1}^{\infty} C_n \sin\left(\frac{n\pi}{l}x\right)\left(\exp\left(\frac{n\pi}{l}z\right) + D_n \exp\left(-\frac{n\pi}{l}z\right)\right) \quad \text{(Eq. B.9)}$$

$C_n$ and $D_n$ are constants. $D_n$ is found by applying boundary conditions $$k/h_1 \frac{\partial\theta}{\partial z}\Big|_{z=\frac{t}{2}} = -\theta$$

for the top surface. The result is:

$$D_n = \frac{\exp\left(\frac{n\pi a}{l}\right)\left(\frac{k}{h_1}\left(\frac{n\pi}{l}\right)+1\right)}{\left(\frac{k}{h_1}\left(\frac{n\pi}{l}\right)-1\right)} \quad \text{(Eq. B.10)}$$

The second boundary condition on the bottom surface is $$k/h_2 \frac{\partial\theta}{\partial z}\Big|_{z=-\frac{t}{2}} = -q''/h_2 + \theta.$$

$$C_n \sin\left(\frac{n\pi}{l}x\right)\left(\exp\left(-\frac{n\pi t}{2l}\right)\left(\frac{k}{h_2}\left(\frac{n\pi}{l}\right)-1\right)- \right.$$
$$\left. D_n \exp\left(\frac{n\pi t}{2l}\right)\left(1+\left(\frac{n\pi}{l}\right)\frac{k}{h_2}\right)\right) = -q''/h_2 \quad \text{(Eq. B.11)}$$

Rewriting and using Fourier series $$\sum_{n=1}^{\infty} -\frac{4}{n\pi}\frac{q''}{h_2}\left(\sin\left(\frac{n\pi}{2}\right)\right)^2 \sin\left(\frac{n\pi}{l}x\right)$$

instead of constant $-q''/h_2$ gives:

$$C_n = \frac{\frac{-4}{n\pi}\frac{q''}{h_2}\left(\sin\left(\frac{n\pi}{2}\right)\right)^2}{\left(\exp\left(-\frac{n\pi a}{2l}\right)\left(\frac{k}{h_2}\left(\frac{n\pi}{l}\right)-1\right)- D_n \exp\left(\frac{n\pi a}{2l}\right)\left(1+\left(\frac{n\pi}{l}\right)\frac{k}{h_2}\right)\right)} \quad \text{(Eq. B.12)}$$

FIG. 15 shows heat transfer from a two-dimensional bar with heat generation, and two ends are maintained at room temperature. Convection with air exists on the top and bottom surfaces using only first convection coefficient 450 as h. The length of the bar is I, and it has t as thickness value.

The 2D heat transfer equation with heat generation is given as:

$$\frac{\partial^2\theta}{\partial x^2} + \frac{\partial^2\theta}{\partial z^2} = -\frac{W_p}{k} \quad \text{(Eq. B.13)}$$

The homogeneous solution subjected to ends $\theta|_{x=0}=\theta_{x=l}=0$ boundary conditions is:

$$\theta^h = \sum_{n=1}^{\infty} C_n \sin\left(\frac{n\pi}{l}x\right)\left(\sinh\left(\frac{n\pi}{l}z\right) + \cosh\left(\frac{n\pi}{l}z\right)\right) \quad \text{(Eq. B.14)}$$

Because of symmetry condition, heat flux is zero at z=0, which means $$\frac{\partial\theta}{\partial z}\Big|_{z=0} = 0.$$

This gives:

$$\theta^h = \sum_{n=1}^{\infty} C_n \sin\left(\frac{n\pi}{l}x\right)\left(\cosh\left(\frac{n\pi}{l}z\right)\right) \quad \text{(Eq.B.15)}$$

The particular solution for Eq. B.6 is:

$$\theta^p = \frac{W_p l^2}{2k}\left(\left(\frac{x}{l}\right)^2 - \left(\frac{x}{l}\right)\right) \quad \text{(Eq.B.16)}$$

The total solution is found as the summation of the homogenous and particular solution.

$$\theta = \theta^h + \theta^p = \sum_{n=1}^{\infty} C_n \sin\left(\frac{n\pi}{l}x\right)\left(\cosh\left(\frac{n\pi}{l}z\right)\right)\frac{W_p l^2}{2k}\left(\left(\frac{x}{l}\right)^2 - \left(\frac{x}{l}\right)\right) + \quad \text{(Eq.B.17)}$$
$$\frac{W_p l^2}{2k}\left(\left(\frac{x}{l}\right)^2 - \left(\frac{x}{l}\right)\right)$$

$C_n$ is found by applying the boundary condition $$\frac{k}{h}\frac{\partial\theta}{\partial z}\Big|_{z=\frac{t}{2}} = -\theta$$

and replacing $$\left(\left(\frac{x}{l}\right)^2 - \left(\frac{x}{l}\right)\right)$$

with its sinusoidal Fourier series $$\sum_{n=1}^{\infty} \frac{4}{n^3\pi^3}((-1)^n - 1)\sin\left(\frac{n\pi x}{l}\right).$$

The result is:

$$C_n = \frac{\frac{W_p l^2}{2k}\frac{2h}{n^3\pi^3}((-1)^n - 1)}{\left(\left(\frac{n\pi}{l}\right)k \sinh\left(\frac{n\pi a}{2l}\right) + h \cosh\left(\frac{n\pi a}{2l}\right)\right)} \quad \text{(Eq.B.18)}$$

Example Set C

Now suppose that we have done a test at $f_1$ at stress level 1 for $N_1$ cycles. How many more cycles can be run if the stress and frequency level are changed to different values. From Eq. 26, $$FFE = N_1 \frac{\beta(P_1 - P_1^*)}{f_1 T_{s1}} + N_2 \frac{\beta(P_2 - P_2^*)}{f_2 T_{s2}} \qquad \text{(Eq.C.1)}$$

The new frequency is $f_2$. The surface temperature changes to $T_{s2}$ and heater power in new condition is found as $P_2$. The power related to non-damaging temperature rise is $P^*_2$.

Knowing FFE and the entire first term on the right-hand side allows calculating the second term on the right hand side. The second term requires an experiment to determine $T_{s2}$ and $P_2$. Then we can solve for $N_2$, the number of cycles expected before failure becomes imminent.

This implies that, in general, the portion of spent entropy exhausted by each given stress and frequency is given by:

$$N_i \frac{\beta(P_i - P_i^*)}{f T_{si}}$$

If two sides of Eq. C.1 are divided by FFE we find $$1 = N_1 \frac{\beta(P_1 - P_1^*)}{FFE f_1 T_{s1}} + N_2 \frac{\beta(P_2 - P_2^*)}{FFE f_2 T_{s2}} \qquad \text{(Eq.C.2)}$$

The percentage of life spent for each load and frequency condition is $$N_i \frac{\beta(P_i - P_i^*)}{FFE f_i T_{si}}$$

For a system with several loading cycles at different loads and frequencies (i.e., a duty cycle), Eq. C.1 can be expanded in terms of the load and frequency conditions as follows.

$$FFE = N_1 \frac{\beta(P_1 - P_1^*)}{f_1 T_{s1}} + N_2 \frac{\beta(P_2 - P_2^*)}{f_2 T_{s2}} + \dots + N_n \frac{\beta(P_n - P_n^*)}{f_n T_{sn}} \qquad \text{(Eq.C.3)}$$

The remaining useful life can be evaluated at any stage as described above.

And with the same explanation given for Eq. C.2, we have, $$1 = N_1 \frac{\beta(P_1 - P_1^*)}{FFE f_1 T_{s1}} + N_2 \frac{\beta(P_2 - P_2^*)}{FFE f_2 T_{s2}} + \dots + N_n \frac{\beta(P_n - P_n^*)}{FFE f_n T_{sn}} \qquad \text{(Eq.C.4)}$$

Heating elements used in embodiments described herein may be configured as adjustable heating elements such that the length of the heating element may be altered by moving an electrical contact along the length of the heating element such that a variable portion of the heating element is in the circuit. Further, specimens and mechanical components having more complicated geometries may be matched with heating elements configured to match the temperature profiles experienced during mechanical fatigue. This may be accomplished by flexible configurations of heating elements or groupings of heating elements. The collection, modification, combination, grouping, or configuration of heating elements for use in techniques based on the disclosures herein are application specific and too numerous to completely describe.

Evaluation methods described herein may, for example, comprise conducting a first cyclic mechanical test of a component thereby establishing a relationship between a measure of actuation during the first cyclic mechanical test and a first temperature profile of the component; conducting a first external heating test comprising externally heating the component generating a second temperature profile matching the first temperature profile; and estimating a fatigue lifespan of the component based on an observed surface temperature and an observed external heating power. In a related embodiment the measure of actuation may be a measure of stress. In a related embodiment the measure of actuation may be a measure of strain. In a related embodiment the measure of actuation may be a measure of displacement. In a related embodiment the component may be subjected to compression during the first cyclic mechanical test. In a related embodiment the component may be subjected to bending during the first cyclic mechanical test. In a related embodiment the component may be subjected to tension during the first cyclic mechanical test. In a related embodiment the component may be subjected to shear loading during the first cyclic mechanical test. In a related embodiment the component may be subjected to torsion during the first cyclic mechanical test. In a related embodiment the component may be subjected to compression during the first cyclic mechanical test. In a related embodiment the first cyclic mechanical test may expose the component to a level of fatigue exceeding an endurance limit of the component. In a related embodiment the method may further comprise evaluating an energy dissipation rate based on a cooling test on the component. In a related embodiment the method may further comprise evaluating an initial slope of temperature rise at an onset of mechanical fatigue of the component. In a related embodiment a first portion of the observed external heating power corresponds to a damaging portion of power applied in the first cyclic mechanical test. In a related embodiment the method may further comprise a second cyclic mechanical test on the component conducted at a different fatigue amplitude. In a related embodiment the observed surface temperature may be a steady-state temperature.

Evaluation methods described herein may, for example, comprise conducting a first cyclic mechanical test of a component thereby establishing a relationship between a measure of actuation during the first cyclic mechanical test and a first temperature profile of the component; conducting a first external heating test comprising externally heating the component generating a second temperature profile matching the first temperature profile; and estimating a fatigue lifespan of the component based on an observed surface temperature and an observed external heating power according to the equation:

$$N_f = FFE \frac{f T_s}{\beta(P - P^*)}.$$

In a related embodiment the method may further comprise evaluating an energy dissipation rate based on a cooling test on the component. In a related embodiment the method may further comprise evaluating an initial slope of temperature rise at an onset of mechanical fatigue of the component. In a related embodiment the measure of actuation may be a measure of displacement.

Evaluation methods described herein may, for example, be used in the accelerated testing and the rapid testing of prototypes, manufactured components, and components that are used in unique service conditions. The methods may be of particular utility in the assessment of 3D printed components and other components having a lower structural uniformity. Items subjected to cyclic mechanical fatigue in which the item-to-item service life varies by more than 20% may be evaluated using these methods. The techniques described herein may be applied to windmill components, various oil and gas components, and many other industrial applications. The methods may also be applied to unique service conditions including conditions in which components undergo multi-axial loading. Applications of this method may involve rotating bending motions during the first cyclic mechanical test.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

The invention claimed is:

1. An evaluation method comprising:
a. conducting a first cyclic mechanical test of a component thereby establishing a relationship between a measure of actuation during the first cyclic mechanical test and a first temperature profile of the component;
b. conducting a first external heating test comprising externally heating the component generating a second temperature profile matching the first temperature profile; and
c. estimating a fatigue lifespan of the component based on an observed surface temperature and an observed external heating power.

2. The method of claim 1 wherein the measure of actuation is a measure of stress.

3. The method of claim 1 wherein the measure of actuation is a measure of strain.

4. The method of claim 1 wherein the measure of actuation is a measure of displacement.

5. The method of claim 1 wherein the component is subjected to compression during the first cyclic mechanical test.

6. The method of claim 1 wherein the component is subjected to bending during the first cyclic mechanical test.

7. The method of claim 1 wherein the component is subjected to tension during the first cyclic mechanical test.

8. The method of claim 1 wherein the component is subjected to shear loading during the first cyclic mechanical test.

9. The method of claim 1 wherein the component is subjected to torsion during the first cyclic mechanical test.

10. The method of claim 1 wherein the first cyclic mechanical test exposes the component to a level of fatigue exceeding an endurance limit of the component.

11. The method of claim 1 further comprising evaluating an energy dissipation rate based on a cooling test on the component.

12. The method of claim 1 further comprising evaluating an initial slope of temperature rise at an onset of mechanical fatigue of the component.

13. The method of claim 1 wherein a first portion of the observed external heating power corresponds to a damaging portion of power applied in the first cyclic mechanical test.

14. The method of claim 1 further comprising a second cyclic mechanical test on the component conducted at a different fatigue amplitude.

15. The method of claim 1 wherein the observed surface temperature is a steady-state temperature.

16. An evaluation method comprising:
a. conducting a first cyclic mechanical test of a component thereby establishing a relationship between a measure of actuation during the first cyclic mechanical test and a first temperature profile of the component;
b. conducting a first external heating test comprising externally heating the component generating a second temperature profile matching the first temperature profile; and
c. estimating a fatigue lifespan of the component based on an observed surface temperature and an observed external heating power according to the equation:

$$N_f = FFE \frac{fT_s}{\beta(P - P^*)};$$

d. wherein FFE is fracture fatigue entropy;
e. wherein f is frequency;
f. wherein $T_s$ is absolute surface temperature:
g. wherein $\beta$ is an experimentally determined parameter;
h. wherein P is power consumed;
i wherein P* is a non-damaging portion of the power consumed; and
j. wherein $N_f$ is a number of cycles to failure.

17. The method of claim 16 further comprising evaluating an energy dissipation rate based on a cooling test on the component.

18. The method of claim 16 further comprising evaluating an initial slope of temperature rise at an onset of mechanical fatigue of the component.

19. The method of claim 16 wherein the measure of actuation is a measure of displacement.

* * * * *